March 11, 1930.                E. G. LANE                1,750,603
                              SPRING SHACKLE
                            Filed Nov. 7, 1927

Inventor
Edwin G. Lane
By
Attorneys

Patented Mar. 11, 1930

1,750,603

UNITED STATES PATENT OFFICE

EDWIN GEORGE LANE, OF PONTIAC, MICHIGAN, ASSIGNOR TO YELLOW TRUCK AND COACH MANUFACTURING COMPANY, OF PONTIAC, MICHIGAN, A CORPORATION OF MAINE

SPRING SHACKLE

Application filed November 7, 1927. Serial No. 231,568.

This invention relates to motor vehicles and more particularly to an improvement in spring shackles.

Spring shackles as ordinarily constructed and especially when used on large trucks require quite a lot of attention and frequent adjustment for wear, and usually they are hard to get at.

One of the objects of the present invention is to provide a pivotal connection which will securely hold the parts in proper relation while permitting their free relative pivotal movement, and which will readily allow adjustments to compensate for wear, without necessitating disassembly of the parts.

Figure 1:
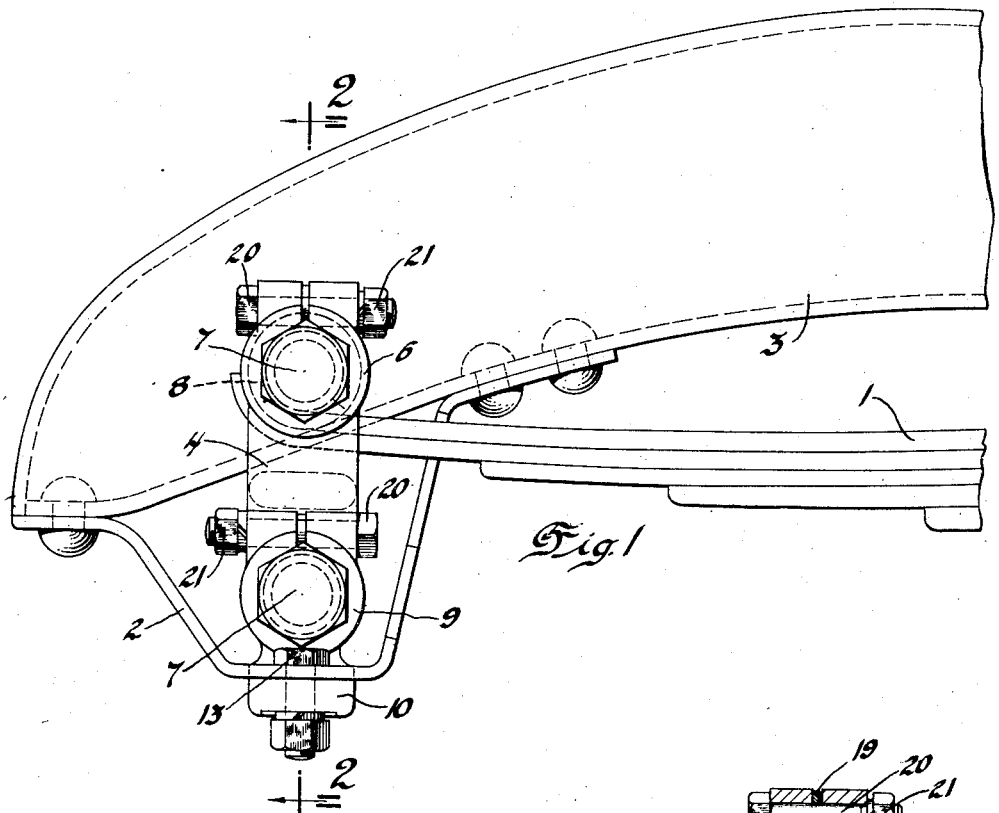
Figure 3:
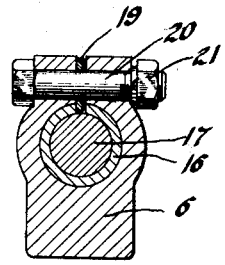
Figure 2:
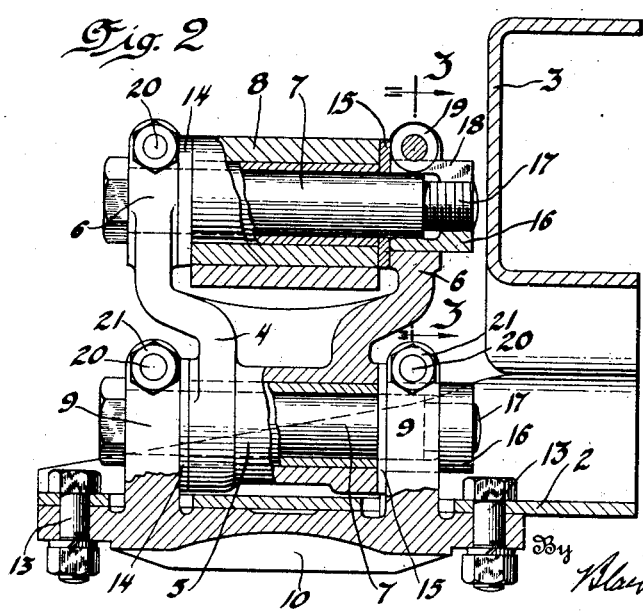

Other objects and advantages of the invention will be apparent from the following specification taken in connection with the accompanying drawing, wherein Fig. 1 is a side elevation of portions of a vehicle chassis frame and a load supporting spring, connected with each other by a swinging shackle embodying the present invention;

Fig. 2 is a front elevation of the shackle link, parts being shown in section as having been taken on line 2—2 of Fig. 1, and Fig. 3 is a detail section taken on line 3—3 of Fig. 2.

Referring more particularly to the drawing and the preferred embodiment of the invention illustrated therein, the reference character 1 indicates a multi-leaf semi-elliptical load supporting spring, and 2 is an end portion of a transverse frame member which is secured to and projects for a short distance beyond the side of the longitudinally extending channel shaped side member or sill 3 of a vehicle chassis frame to be flexibly suspended upon the spring. The suspension of the frame from the spring is effected by means of a swinging shackle link 4 having pivotal connection with both the spring and frame. In this instance, the shackle comprises a head 5 at one end, and a pair of spaced upwardly extending slit ears 6—6 at the other end. The connections at opposite ends of the shackle are made by the pivot pins or bolts 7—7, one of which is carried by the ears 6—6 and passes thru the eye 8 formed at the end of the main spring leaf, while the other forms a mounting for the head 5 and extends between a pair of spaced apart split ears 9—9 projecting upwardly thru openings in the bottom of the frame portion 2, and being integral parts of a bracket plate 10 secured by bolts 13 on the underside of the frame member. Bearing washers or thrust collars 14 and 15 are carried by the pivot pins between opposite sides of the head 5 and split ears 9—9 and the spring eye 8 and split ears 6—6. On the end of each bolt is an axially movable sleeve 16, which may be formed either separately or as an integral part of the thrust collar 15, and which has screw threaded engagement with the reduced portion 17 of the bolt, whereby rotation of the bolt imparts a relative axial sliding movement to the sleeve and thus changes the relation of the two thrust collars 14 and 15. To maintain the sleeve 16 against rotation with the bolt, it is split thruout its length to provide a way or groove 18, into which extends a washer or key 19 located in the space between the split portions of the innermost ear, and carried on the bolt 20. A bolt 20 is provided to pass thru alined apertures in the split portions of each ear, which upon tightening of the nut 21 screw threaded on the end thereof, draws the split portions together to contract the ear as well as the split sleeve 16 and securely hold the pivot pin 7 against rotation.

When it is desired to take up looseness and adjust the parts for wear, the nuts 21 are turned back to allow the split portions of the ears to spread apart, after which the pivot pin 7 may be readily rotated upon the engagement of a wrench with the hexagonal head on the outer end thereof. After the pivot pin has been turned a sufficient distance to move the sleeve 16 and with it the collar 15 to compensate for wear caused by side thrust, the ears may again be contracted to hold the parts in adjusted position.

From the above description it will be apparent that there is provided a device which enables adjustments to be easily and quickly made to insure the proper fitting of parts, and eliminate noise and rattles ordinarily resulting from wear, without necessitating disassembly of the connection or requiring the repairman to crawl under the vehicle or make adjustments in otherwise inaccessible places.

While the description has been somewhat specific as to structure, it is to be understood that the invention is not limited to exact details, and that such modifications may be made as come within the scope of appended claims.

Having described the invention, I claim:

1. In a pivot joint, the combination with a pair of split ears and a member interposed therebetween, of a nut carried in one of the ears and having an axial groove in its periphery, an adjustable element connecting the split ends of said ear to contract the ear about the nut and hold it against movement, a key carried by said element and projecting into said axial groove to hold the nut against rotation but permit its axial sliding movement in the ear when the split ends are expanded, a pivot pin extending thru the other of said ears and the member into threaded engagement with the nut whereby to move the nut axially upon rotation of the pin, and means to contract the split ends of the last mentioned ear about the pin to hold the pin against rotation.

2. In a pivot joint, the combination with a pair of split apertured ears spaced apart, and a member interposed therebetween, of a rotatable pin extending thru the apertures in said ears and thru the member to connect said parts for relative pivotal movement, an adjustable element connecting the split ends of one of said ears to contract the ends about the pin to hold it against rotation, a nut carried in the aperture of the other of said ears and having threaded engagement with said pin and being provided with an axial groove in its periphery, an adjustable element connecting the split ends of the last mentioned ear to contract the ends about the nut and hold it against movement, a washer loosely carried by said adjustable element and extending into said axial groove to key the nut with the ear and hold it against rotation but permit its axial sliding movement in the ear when the split ends are expanded and upon rotation of the pin, and a pair of thrust washers carried by the pin on opposite sides of said member, the relation of which may be varied by sliding said nut axially upon rotation of the pin.

3. In a pivot joint, the combination with a pair of split ears and a member interposed therebetween, of a nut carried in one of the ears, means to key the nut in the ear for relative sliding movement, an adjustable element to contract the split ends of the ear about the nut to hold it against movement, a pivot pin extending thru the other of said ears and said member into threaded engagement with said nut to move the nut axially upon pin rotation, and means to contract said last mentioned ear about the pin to prevent its rotation.

4. In a pivot joint, the combination with a pair of spaced ears and a member interposed between the ears, of a nut having axial sliding engagement in one of the ears, means associated with said ear adapted to hold the nut against sliding movement, a pivot pin extending thru the other ear and thru the member and into threaded engagement with the nut, whereby rotation of the pin tends to slide the nut axially, and means associated with the last mentioned ear for locking the pin against rotation.

5. In a pivot joint, the combination with a pair of split ears and a member interposed therebetween, of a nut carried in one of the ears, means to key the nut in the ear for relative sliding movement, an adjustable element to contract the split ends of the ear about the nut to hold it against movement, a pivot pin extending thru the other of said ears and said member into threaded engagement with said nut to move the nut axially upon pin rotation, and means to contract said last mentioned ear about the pin to prevent its rotation and a pair of thrust collars adapted for contact with opposite sides of said member and being adjustable relative to each other upon the axial movement of said nut.

6. In a pivot joint, the combination with a pair of split ears and a member interposed therebetween, of a nut carried in one of the ears, means to key the nut in the ear for relative sliding movement, an adjustable element to contract the split ends of the ear about the nut to hold it against movement, a pivot pin extending through the other of said ears and said member into threaded engagement with said nut to move the nut axially upon pin rotation, and means to contract said last mentioned ear about the pin to prevent its rotation and a thrust element associated with said nut for contact with the side of said member.

7. In a pivot joint, the combination with a pair of spaced ears and a member interposed between the ears, of a nut having axial sliding engagement in one of the ears, means associated with said ear adapted to hold the nut against sliding movement, a pivot pin extending thru the other ear and thru the member and into threaded engagement with the nut, whereby rotation of the pin tends to slide the nut axially, and means associated with the last mentioned ear for locking the pin against rotation and a thrust bearing for the side of said member adjustable relative thereto upon sliding movement of said nut.

In testimony whereof I affix my signature.

EDWIN GEORGE LANE.